Figure 1:
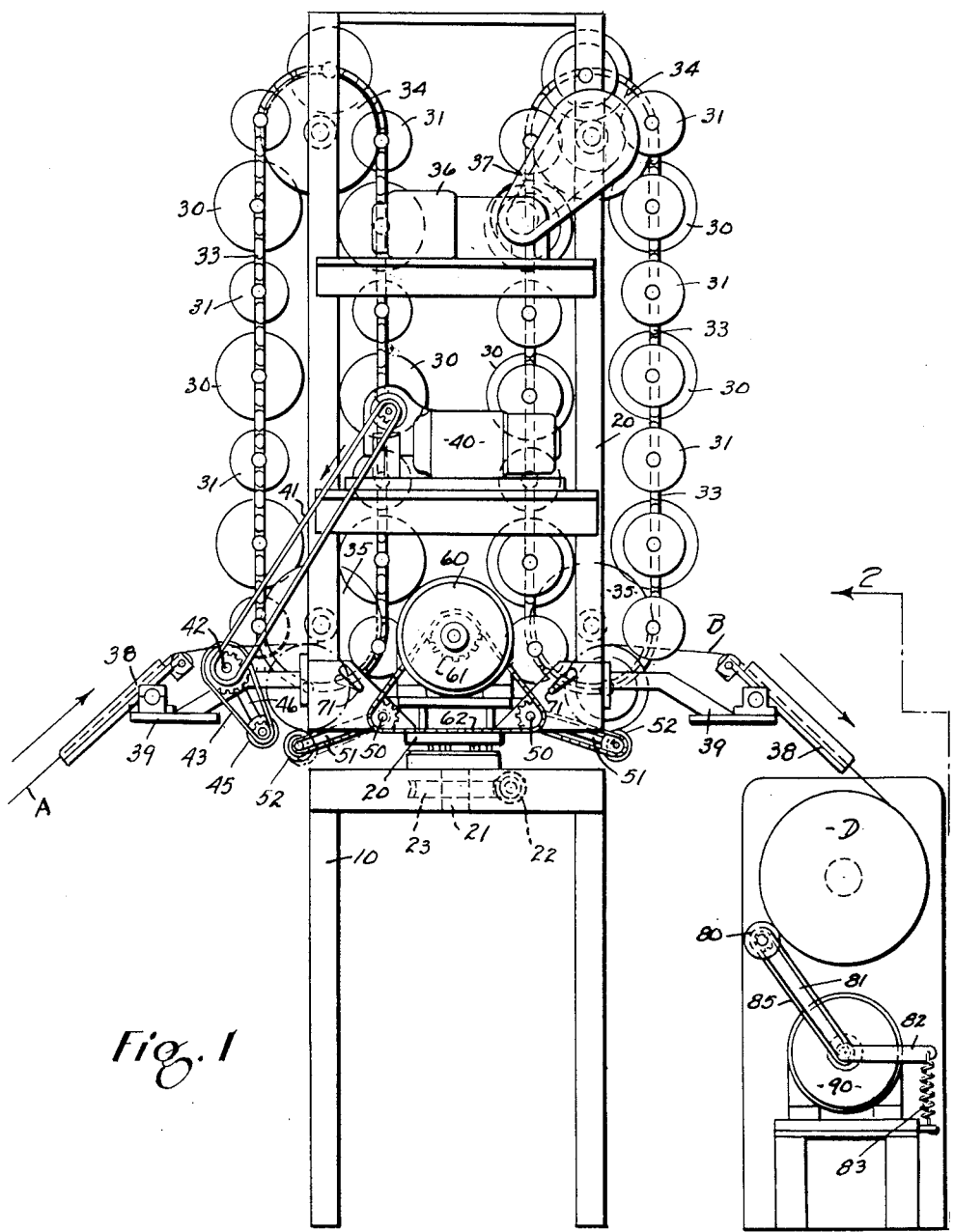

Jan. 13, 1953 — H. C. BOSTWICK — 2,625,198
TIRE BUILDING APPARATUS
Filed June 27, 1950 — 4 Sheets-Sheet 1

INVENTOR.
HENRY C. BOSTWICK
BY Bates, Teare, & McLean
Attorneys

Jan. 13, 1953  H. C. BOSTWICK  2,625,198
TIRE BUILDING APPARATUS
Filed June 27, 1950  4 Sheets-Sheet 2

INVENTOR.
HENRY C. BOSTWICK
BY
Bates, Teare, & McBean
Attorneys

Jan. 13, 1953  H. C. BOSTWICK  2,625,198
TIRE BUILDING APPARATUS
Filed June 27, 1950  4 Sheets-Sheet 3

INVENTOR.
HENRY C. BOSTWICK
BY
Bates, Teare, & McBean
Attorneys

Jan. 13, 1953 H. C. BOSTWICK 2,625,198
TIRE BUILDING APPARATUS
Filed June 27, 1950 4 Sheets-Sheet 4

INVENTOR.
HENRY C. BOSTWICK
BY
Bates, Teare, & McBean
Attorneys

Patented Jan. 13, 1953

2,625,198

UNITED STATES PATENT OFFICE 2,625,198

TIRE BUILDING APPARATUS

Henry C. Bostwick, Coventry Township, Summit County, Ohio, assignor to The Akron Standard Mold Company, Akron, Ohio, a corporation of Ohio Application June 27, 1950, Serial No. 170,663

14 Claims. (Cl. 154—10)

This invention is concerned with a method and apparatus for building tires from stock supplied to a tire building drum and is characterized by means for feeding the stock from the supply thereof at the same traveling speed as that at which it is wound onto the drum, so that the stock is neither stretched nor slackened in its transition. The apparatus which I have devised for carrying out this method comprises a rotatable tire building drum, a rotatable stock carrying roll, from which the stock may pass directly to the drum, a roller frictionally engaging the material wound on the drum, a roller frictionally engaging the stock on the storage roll, and driving mechanism from the drum-engaging roller to the stock-engaging roller to rotate the latter at the same peripheral speed as the former.

To enable efficiency in operation, I provide the stock carrying members in two units on opposite sides of a rotatable turret so that stock may be loaded on one unit while being withdrawn from the other unit, and thereafter the turret may be turned to interchange the positions of the units so that the empty unit from which the stock was being fed may be re-loaded and the full unit in which the stock has been wound may be used to discharge it to the tire drum. I provide motor mechanism on the turret to drive the particular stock roll which is in discharging position without operating any other roll or interfering with its independent operation.

To feed the stock from the positioned roll to the tire drum at the same speed as that at which it is being mounted on the tire drum, I connect the driving roller engaging the stock on the positioned stock roll with the roller engaging the stock on the tire drum by a Selsyn control system which insures uniform peripheral movement of the two rollers. In such system, I cause the driving roller, coacting with the tire drum fabric, to operate a Selsyn transmitter or generator which is connected by suitable electric conductors with a Selsyn receiver on the turret, such receiver constituting the motor to operate the stock engaging roller, such connecting means being effective notwithstanding the turning of the turret on its axis.

The operation resulting from the described apparatus is that, though the material on the tire drum builds up and thus produces a driving member of continually increasing diameter, and the stock roll becomes gradually reduced in diameter, nevertheless the stock is fed from the roll at just the speed at which it is used, irrespective of such constantly changing relation of the two diameters. Thus the stock is maintained taut between the supply roll and the tire drum without being either stretched or crinkled.

My invention is hereinafter more fully explained in connection with an embodiment thereof illustrated in the drawings, which is hereinafter described in detail.

Figure 2:
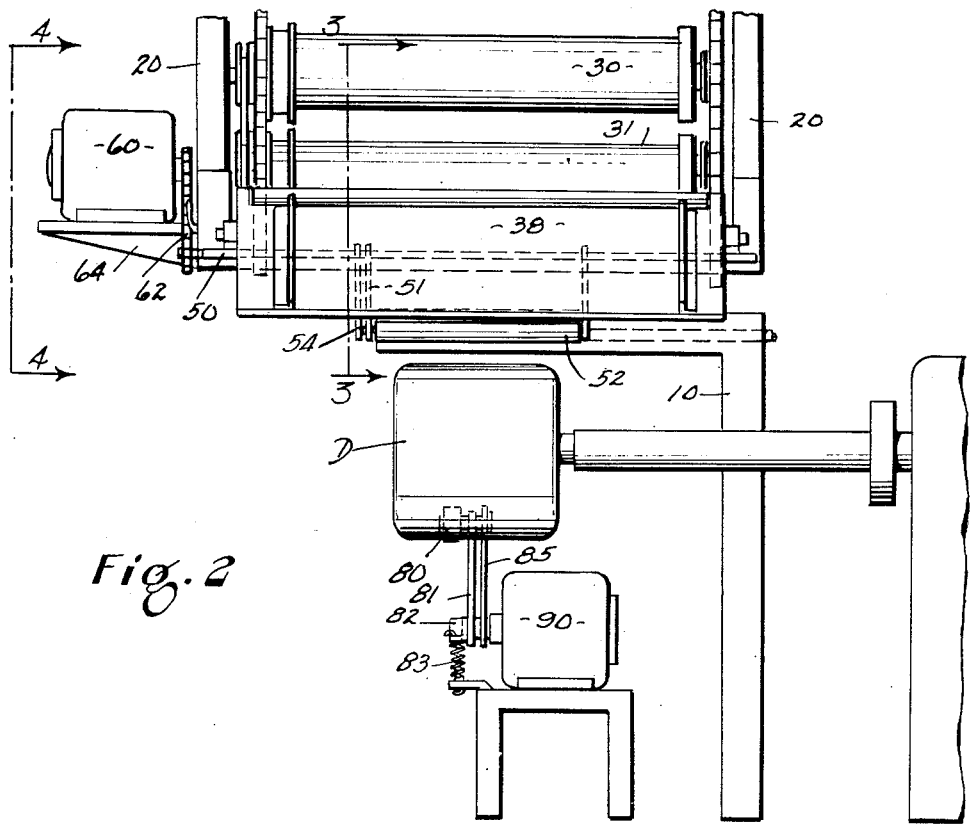
Figure 3:
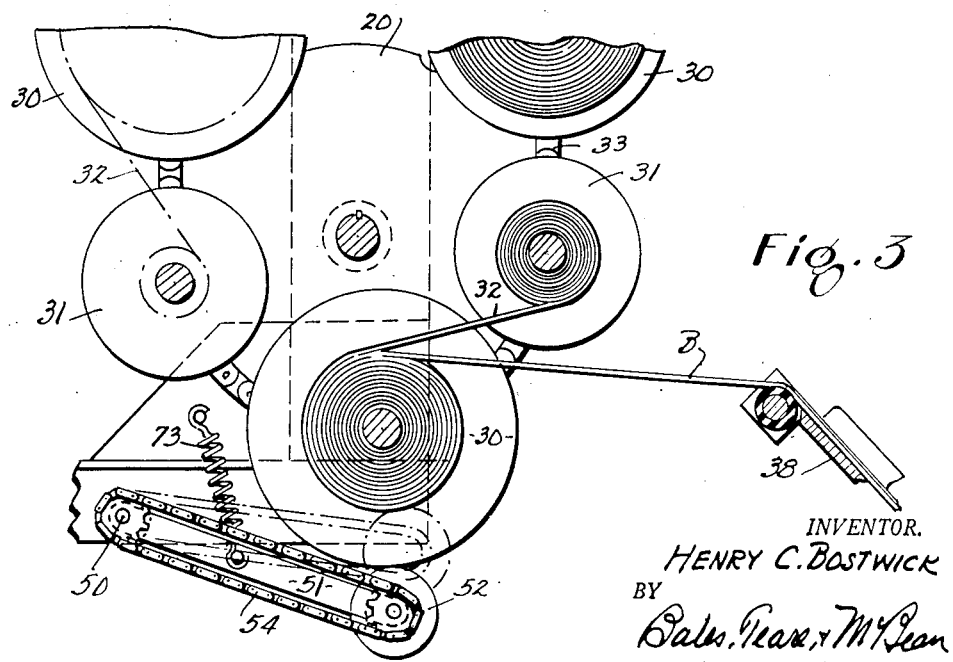
Figure 4:
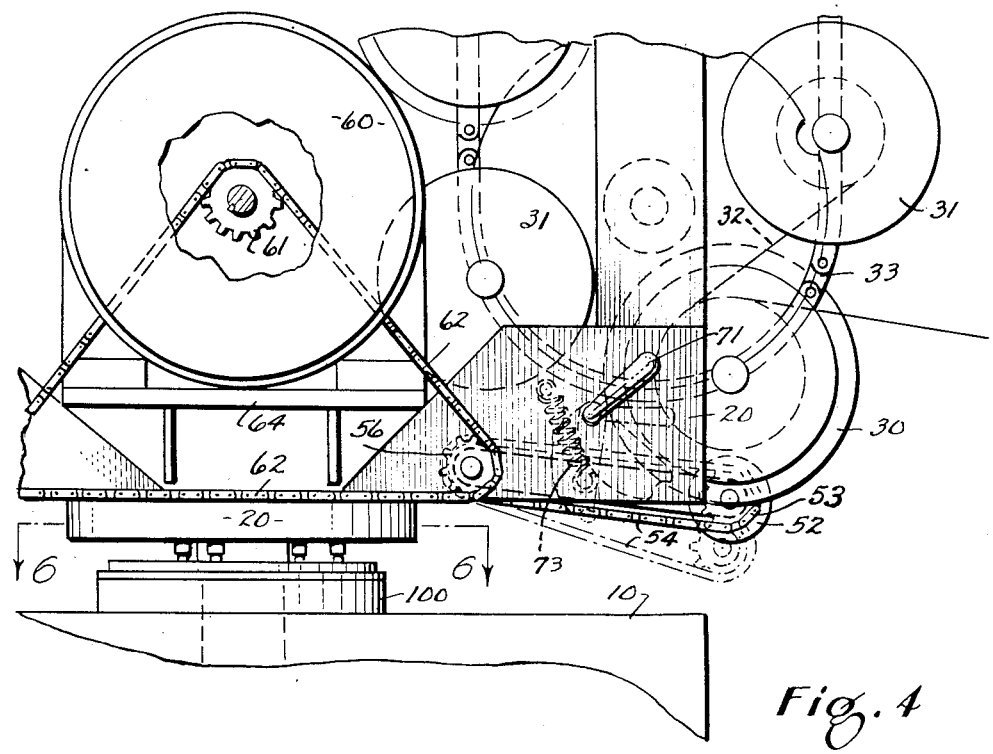
Figure 5:
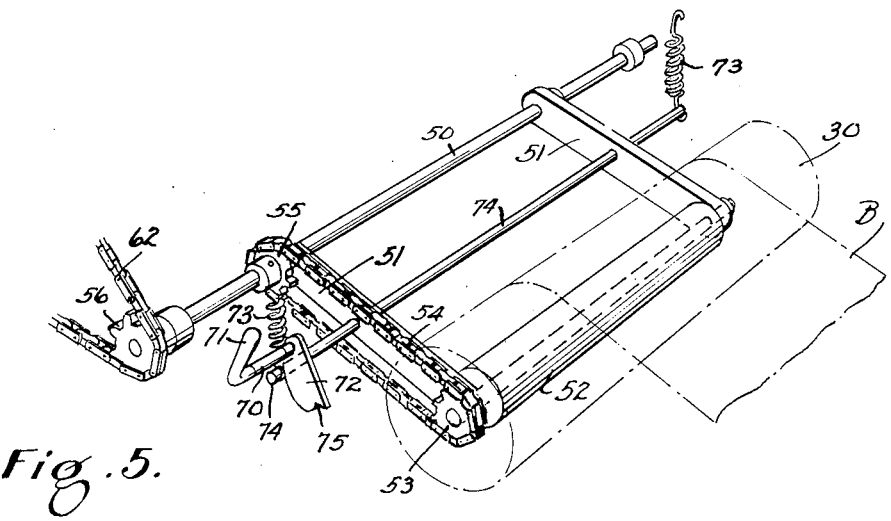
Figure 6:
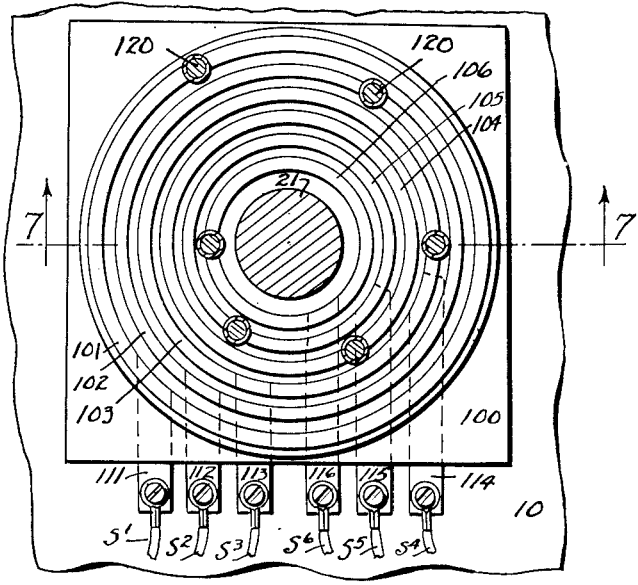
Figure 8:
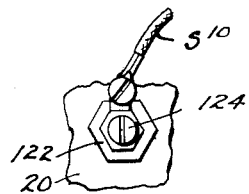
Figure 7:
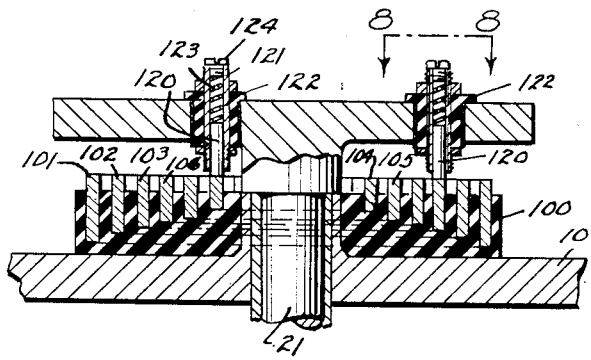
Figure 9:
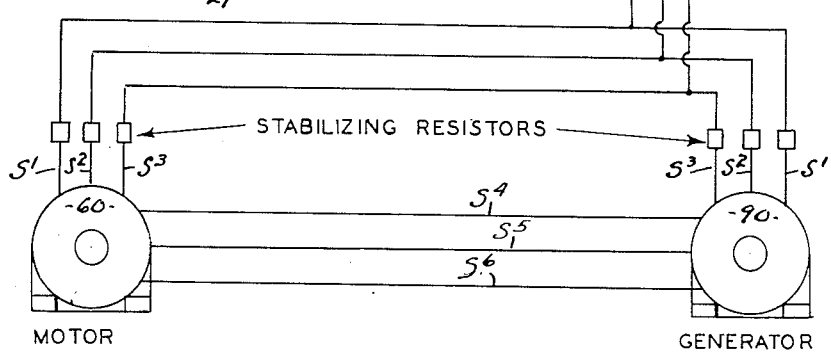

In the drawings, Fig. 1 is a side elevation of a servicing device having the present invention thereon; Fig. 2 is an end view of a portion of the machine taken from the direction indicated by the line 2—2 in Fig. 1; Fig. 3 is a section taken on the plane indicated by the line 3—3 in Fig. 2; Fig. 4 is a fragmentary elevation taken from a direction indicated by the line 4—4 in Fig. 2, and on a scale somewhat larger than that in Fig. 2; Fig. 5 is a perspective view illustrating the mounting for the roll that bears against the stock roll; Fig. 6 is a horizontal section taken on a plane indicated by the line 6—6 in Fig. 4; Fig. 7 is a vertical section taken on a plane indicated by the line 7—7 in Fig. 6; Fig. 8 is a detail in top plan of one of the electric contact devices as indicated by the line 8—8 in Fig. 7; Fig. 9 is a wiring diagram of the Selsyn control system.

In Fig. 1, I illustrate my invention as applied to a servicing machine of the type shown in my Patent No. 2,242,810, issued May 20, 1941 to my assignee Akron Standard Mold Company. Like that patent the present invention has a base 10 supporting a turret 20 mounted to turn on a vertical pivot indicated at 21. The turret carries two sets of stock storage rolls 30 and cooperating liner sheets (32, Fig. 3) on rolls 31. Suitable power means are provided to rotate the turret 180° whenever desired to transfer the freshly loaded rolls from the position at the left hand in Fig. 1 into position at the right hand for unloading, and correspondingly the empty rolls into position for loading. The turning mechanism is indicated by the driving worm 22 and the worm 23 on the pivot shaft 21 rigid with the turret.

The stock rolls and liner rolls are arranged alternately and are shown as rotatably supported at their ends by endless chains 33 passing about sprocket wheels 34, 35 on shafts journaled in the turret. A pair of motors are belted to wheels on the shafts which carry the upper sprocket wheel 34 supporting the endless chains. One of these motors 36 with its belt 37 are shown in Fig. 1, and the other motor and belt at the opposite end of the turret are duplicates and drive the other sprocket wheel 34.

By the means described, the set of rolls may be shifted to bring any storage roll to position for loading or unloading. It is to be understood that when one roll in the lowermost position shown at the left hand is being loaded with strip stock A, the lowermost roll at the right hand is in position for discharge of the stock as indicated at B to a tire building drum D. In passing to or from the servicer, the fabric is supported by a table 38 pivotally mounted on a bracket 39 projecting from the turret.

To load the stock, a pair of motors, one shown at 40 in Fig. 1, and the other being a duplicate at the other end of the turret, are each connected by a belt 41 to a lay shaft 42 carrying a sprocket connected by a belt 43 to a sprocket attached to a roller 45 on an arm 46 pivoted on the axis of the shaft 42. By this means the roller 45 may be brought into engagement with a disc-like portion of any roll positioned in front of such roller thereby rotating that roll in the direction to wind up the stock thereon. The direction of travel of the belt 43 is such that it tends to lift the roller 45, from the idle position shown in Fig. 1, and thus maintains it in engagement with the stock roll to be driven.

My prior patent referred to shows the stock as drawn off by hand from the delivery roll in position adjacent the tire building drum. A brake was provided on the stock roll to maintain a tension on the stock as it was drawn off. It has been found, however, in such operation that it is difficult to prevent stretching of the stock and any stretch may be detrimental to the proper formation of the tire. In the present invention, I provide means to avoid this stretching, as heretofore mentioned and which I will now describe.

Mounted in the lower portion of the turret are a pair of shafts 50 each carrying downwardly and outwardly projecting rock arms 51. At their outer ends each pair of arms carries a roller 52 which by springs 73 (Figs. 4 and 5) tends to engage stock on the lowermost stock roll. The roller 52 carries a sprocket wheel 53 which is connected by a sprocket chain 54, with a sprocket 55 on the shaft 50. On this shaft is a driving sprocket 56.

The turret carries on a bracket 64 a motor 60 on the shaft of which is a sprocket wheel 61. A sprocket chain 62 (Figs. 1 and 4) passes over this sprocket wheel and around the two sprockets 56. Accordingly, the motor 60 when driven rotates the two rollers 52 and thus rotates any stock roll in engagement therewith.

As the mechanism just described is employed to rotate the lowermost stock roll only when it is in the discharging position, and must have no effect on the lowermost roll in the charging position, I provide means to swing the rocking frame 51, 51 to hold the roller 52 out of engagement with the stock roll being loaded. This idling means, as shown, comprises a rock shaft 70 (Figs. 4 and 5) pivoted in the turret frame and carrying on its outer end an arm 71 which constitutes a manual handle, and on its inner end carrying a cam 72 which may be swung by the handle downwardly to engage and depress a rod 74, carried by the rocking frame. This depresses the roller 52 to the idle position shown in broken lines in Fig. 4. In the idle position, a notch 75 in the cam 72 comes into registration with the rod 74 and thus maintains the rocking frame depressed.

Accordingly, though the roller 52 on the loading side is rotated whenever the roller on the unloading side is rotated by the motor 60, such rotation on the loading side is idle, the rotation of the roll receiving stock being effected by the roller 45 driven by the motor 40 as heretofore explained.

As shown in Fig. 1, I provide adjacent the tire building drum D a roller 80 carried by a pivoted arm 81. This arm has a bell crank extension 82 stressed downwardly by a spring 83. This serves to keep the roller in contact with the stock which has been wound on the tire building drum.

Now, if I can cause the frictional rotation of the roller 80 by the stock on the drum to be at the same peripheral speed as the roller 52 engaging the stock on the stock roll being unloaded, it would follow that the stock would be discharged from the stock roll at just the same speed as it is being wound on the tire drum. I find I can accomplish this uniform rotation of the tire-drum-engaging roller and the stock-driving roller excellently by the employment of a Selsyn control system. Thus, I cause the rotation of the roller 80 to drive a Selsyn transmitting generator and I make the motor 60 the receiver therefor. The Selsyn generator is indicated at 90 in Fig. 1, and is driven by a sprocket chain 85 running over a sprocket wheel on the shaft of the roller 80.

I have illustrated the Selsyn system connecting the motor 60 and the generator 90 in Fig. 9. Three-phase current is supplied from a power source via three lines S and the lines $S^1$, $S^2$, $S^3$ to the generator 90 and the motor 60. The three phase windings of the motor and generator are connected by the three lines $S^4$, $S^5$ and $S^6$.

To enable the connections from the motor 60 to be made to the source and to the transmitting generator notwithstanding the turning of the turret to interchange the position of the loading and discharging stock rolls, I provide the contact ring arrangement shown in Figs. 6, 7 and 8.

The contact arrangement shown provides six rings 101 to 106 inclusive, all concentric about the turret shaft 21, these rings being insulatingly carried by the supporting block 100. Six conducting strips 111 to 116 inclusive lead outwardly in parallel relation from the corresponding rings, as shown in Fig. 6. These six strips are connected to the three conductors $S^1$, $S^2$, $S^3$ leading to the source and three conductors $S^4$, $S^5$, $S^6$ to the generator. The turret is provided with six downwardly projecting contact pins 120 located over, and pressed into contact with, the respective conducting rings.

As shown in Fig. 7, each pin 120 is contactingly carried in a metallic tube 121 insulatingly mounted by a rubber bushing 122 in the base member of the turret. A spring 123 held within the tube by a cap screw 124 presses the pin downwardly into contact with the ring below it. The metal tube 121 forms a terminal of a line (here designated $S^{10}$) from the motor, as shown in Fig. 8.

As the six conductors from the motor—three for the power source and three for the generator—terminate respectively in the six pressure pins 120, and as these pins are always in contact each with its corresponding ring, which is connected with the power source or the generator as the case may be, it follows that irrespective of the position of the turret the Selsyn motor 60 is always in proper electrical connection with the power source and the Selsyn generator.

It results from the Selsyn connection described, and the mechanism I have designed, that, whenever stock is being withdrawn from the stock roll and wound on the tire building drum, that stock has a traveling speed at the stock roll exactly the same as it has at the tire building drum, and this prevents any stretching of the stock in its passage from the stock roll to the drum. By employing a Selsyn generator and motor to cause this uniform unwinding speed of the stock at the stock roll and rewinding at the drum, I avoid the necessity of a mechanical connection between the drum engaging roll and the stock engaging roll, and enable the tire drum to be mounted entirely independently of the servicing machine and located at any convenient distance therefrom.

I claim:

1. In a tire building apparatus, the combination of a rotary stock carrying roll, a rotary tire building drum to which stock may pass from the stock roll, power mechanism for rotating the stock carrying roll and mechanism actuated by the rotation of the drum and independently of a pull on the fabric for causing the roll operating mechanism to rotate the stock roll in the unwinding direction.

2. The combination of a rotary stock roll, a rotary tire building drum, a roller adapted to engage stock on the tire building drum and synchronous means operated by the rotation of said roller and coacting with the stock on the stock roll to unwind the stock at the same traveling speed as the peripheral speed of said roller.

3. In a tire building apparatus, the combination of a stock carrying roll, a rotary tire building drum, a driving roller adapted to engage the stock on the drum and be rotated thereby, a driven roller adapted to engage the stock on the said stock carrying roll, and means actuated by the rotation of the first-mentioned roller for causing the second roller to rotate at the same peripheral speed as the first roller.

4. In a tire building apparatus, the combination of a stock carrying roll, a roller coacting with the stock on said roll, an electric motor for rotating said roller to unwind stock from the roll, a tire building drum, a second roller adapted to engage stock on the tire building drum and electric means operated by rotation of the last-mentioned roller to cause said motor to rotate the first-mentioned roller at the same peripheral speed as the roller which engages the stock on the drum.

5. In a tire building apparatus, the combination of a roll adapted to carry stock, a rotary tire building drum to which stock may be fed from the roll, a Selsyn generator and motor, mechanism operated by the rotation of the drum for operating the generator as the stock is wound on the drum, and mechanism operated by the motor to unwind the stock from the roll.

6. In a tire building machine, the combination of a stock carrying roll, a rotary tire building drum to which stock may pass from the roll, a roller adapted to engage stock on the tire building drum and rotated thereby, a Selsyn generator operated by the rotation of said roller, a Selsyn motor electrically connected to the generator and a roller engaging the stock on the stock roll and operated by said Selsyn motor.

7. The combination, with a stock carrying roll, of movable means carrying a roller adapted to engage the stock on a tire building drum, a Selsyn generator geared with the roller to be rotated thereby, movable means carrying a roller engaging the stock on the stock roll, a Selsyn motor operating the last-mentioned roller, and electrical connections between the Selsyn generator and Selsyn motor.

8. In a tire building apparatus, the combination of a rotary stock carrying roll, a rotary tire building drum, a pivoted arm adjacent the drum, a roller carried by said arm adapted to engage stock on the drum, a Selsyn generator, gearing between the roller and the generator to operate the generator in accordance with the rotation of the roller, an arm pivotally mounted adjacent the stock roll, a roller on said arm adapted to engage stock on the roll, a Selsyn motor operating the last-mentioned roller, and electrical connections between the generator and the motor.

9. The combination of a stock carrying roll, a roller parallel with the stock carrying roll, a swinging frame carrying the roller, means pressing the roller against the stock on the stock roll, a motor, mechanism operated thereby for rotating the roller, a swinging frame carrying a roller adapted to engage material on a tire building drum, a generator operated by the rotation of the last-mentioned roller and electrical connections between the generator and motor adapted to cause the motor-driven roller to have the same peripheral speed as the drum driven roller.

10. A servicing machine having a rotary turret carrying two sets of stock carrying rolls, one of said sets mounted in the turret for loading while the other set delivers stock, means for rotating the turret to interchange the loading and delivery position of said rolls, a pair of rollers adapted to engage stock on each roll, a common driving means for simultaneously rotating both rollers, and means for idling the driven roller which would coact with the stock on the roll being loaded while the other roller, coacting with the stock on the roll from which stock is being delivered, is active.

11. A servicing machine having a rotary turret carrying two sets of stock carrying rolls, one of said sets mounted in the turret for loading while the other set delivers stock, means for rotating the turret to interchange the loading and delivery position of said rolls, a pair of rollers each carried by a swinging frame pivoted to the turret, a motor on the turret, mechanism operated by the motor for rotating both rollers simultaneously, means for swinging one frame away from the stock on the roll being loaded and means for swinging the other frame toward the stock on the roll from which stock is being delivered to cause the roller on the last-mentioned frame to engage and feed the stock.

12. In a servicing machine, the combination of a base, a rotary turret mounted thereto, two stock rolls on the turret means for rotating the turret to interchange the position of said stock rolls, whereby either of them may be in loading position while the other is in discharging position, two pivoted frames on the turret, a roller carried by each frame and adapted to coact with one of the stock rolls, means tending to press the frames toward the rolls to effect such coaction, driving mechanism for the respective rollers leading thereto from the pivotal axes of their frames, a motor on the turret, transmission mechanism operated thereby and connected with both driving mechanisms at said pivotal axes, and means adapted to press each frame away from the correspondingly stock roll and hold its roller out of engagement, whereby that roller may be free from the roll being loaded, and mechanism on the turret for independently rotating that roll.

13. In a tire building apparatus, the combination of a stock carrying roll, a rotary driven tire building drum, a first mechanism coacting with the stock while on the roll, a second mechanism coacting with stock while on the drum, and means synchronously connecting said second mechanism to said first mechanism to unwind the stock from the stock roll at the same speed that it is being wound on the drum.

14. The combination of a stock carrying roll, a tire building drum, means for rotating said drum, a roller engaging the stock on the stock roll, a roller engaging stock on the tire building drum, and means synchronously connecting said drum roller with said stock roller to rotate both rollers at the same peripheral speed.

HENRY C. BOSTWICK.

REFERENCES CITED

The following references are of record in the file of this patent:

UNITED STATES PATENTS

| Number | Name | Date |
|---|---|---|
| 1,045,346 | Whalen | Nov. 26, 1912 |
| 1,121,793 | Brucker | Dec. 22, 1914 |
| 1,320,319 | Convery | Oct. 28, 1919 |
| 2,004,886 | Breth et al. | June 11, 1935 |
| 2,186,814 | Adams | Jan. 9, 1940 |
| 2,242,810 | Bostwick | May 20, 1941 |
| 2,258,350 | Bostwick | Oct. 7, 1941 |
| 2,441,791 | Bostwick | May 18, 1948 |
| 2,521,728 | Bostwick | Sept. 12, 1950 |
| 2,605,196 | Bostwick | July 29, 1952 |